（12）United States Patent
Fukase et al.

(10) Patent No.: US 11,275,251 B2
(45) Date of Patent: Mar. 15, 2022

(54) IMAGE DISPLAY DEVICE (71) Applicant: SEIKO EPSON CORPORATION, Tokyo (JP)

(72) Inventors: Akio Fukase, Chino (JP); Mitsutaka Ide, Shiojiri (JP); Toshiyuki Noguchi, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/097,626

(22) Filed: Nov. 13, 2020

(65) Prior Publication Data

US 2021/0063753 A1 Mar. 4, 2021

Related U.S. Application Data (63) Continuation of application No. 16/676,532, filed on Nov. 7, 2019, now Pat. No. 10,866,424.

(30) Foreign Application Priority Data

Nov. 8, 2018 (JP) .............................. JP2018-210560

(51) Int. Cl.
*G02B 17/08* (2006.01)
*G02B 27/01* (2006.01)
*G03B 33/12* (2006.01)
*G03H 1/02* (2006.01)

(52) U.S. Cl.
CPC ......... *G02B 27/0172* (2013.01); *G03B 33/12* (2013.01); *G03H 1/0248* (2013.01); *G02B 17/0804* (2013.01); *G02B 2027/0174* (2013.01); *G02B 2027/0178* (2013.01)

(58) Field of Classification Search
CPC ........ G02B 27/0172; G02B 2027/0174; G02B 2027/0178; G02B 27/0101; G02B 17/0804; G02B 15/144115; G02B 15/144; G02B 15/1441; G02B 9/34; G02B 5/1814; G02B 5/189; G02B 5/32; G02B 2027/0105; G02B 2027/0107; G03H 1/0248
See application file for complete search history.

(56) References Cited

U.S. PATENT DOCUMENTS

| 6,788,442 B1 | 9/2004 | Potin et al. |
| 2010/0046070 A1 | 2/2010 | Mukawa |
| 2017/0261751 A1 | 9/2017 | Noguchi et al. |

FOREIGN PATENT DOCUMENTS

| JP | 2012-018414 A | 1/2012 |
| JP | 2017-167181 A | 9/2017 |

*Primary Examiner* — Ryan D Howard
(74) *Attorney, Agent, or Firm* — Oliff PLC (57) ABSTRACT An image display device of the present disclosure includes an image light generating device, a first, a second, a third, and a fourth optical unit. A first intermediate image is formed between the first and the third optical unit. A pupil is formed between the second and the fourth optical unit. A second intermediate image is formed between the third and the fourth optical unit. An exit pupil is formed at an opposite side of the fourth optical unit from the third optical unit. The image light generating device includes a first, a second, a third light emitting panel, and a color synthesis element. The color synthesis element is constituted of a cross dichroic prism including a first and a second dichroic film that intersect with each other. Each of the first and the second dichroic film does not have a polarization separation characteristic.

9 Claims, 8 Drawing Sheets

IMAGE DISPLAY DEVICE

This is a Continuation of U.S. application Ser. No. 16/676,532 filed Nov. 7, 2019, which in turn claims the benefit of JP Application Serial Number 2018-210560, filed Nov. 8, 2018. The disclosure of the prior applications is hereby incorporated by reference herein in its entirety.

BACKGROUND

1. Technical Field

The present disclosure relates to an image display device.

2. Related Art

A head-mounted display device configured to guide image light to an eye of an observer while reflecting the image light by using a plurality of reflective surfaces is known. JP-A-2012-18414 discloses a head-mounted display device including a frame, an image generating device, a light-guiding plate that guides light emitted from the image generating device to an eye of an observer, and a first deflection means and a second deflection means for reflecting the light incident on the light-guiding plate.

However, in the head-mounted display device in JP-A-2012-18414, the light-guiding plate is used as a means for guiding light emitted from the image generating device to an eye of an observer. For this reason, there is a problem in that the device becomes large and heavy. Thus, JP-A-2017-167181 discloses a display device configured to guide image light to an eye of an observer by using two diffraction elements constituted of a reflection-type hologram. In JP-A-2017-167181, a combination of a laser light source and a scanning optical system, a liquid crystal panel, an organic electroluminescence (EL) panel, and the like are exemplified as an image light generating device.

It can be said that a reflection-type hologram described in JP-A-2017-167181 is an optical system suitable for a see-through image display device configured to superimpose external light on a display for display since the reflection-type hologram reflects only light in a specific wavelength region and transmits light in the other wavelength region. However, a reflective wavelength width is generally very narrow in a reflection-type hologram, and thus a lot of image light emitted from a display is not reflected by the hologram and is transmitted through the hologram. Thus, there is a problem in that light-guiding efficiency is low.

It is conceivable to use, as an image light generation device, an organic EL panel that can achieve higher contrast than that of a liquid crystal panel, for example. The organic EL panel has features such as low profile and light weight, and is expected to be applied to a direct view display, of course, and also a head-mounted display device in combination with the aforementioned reflection-type hologram. However, when the organic EL panel is combined with an optical system having low light-guiding efficiency, such as the reflection-type hologram, there is a problem in that, when panel luminance is increased, a life of an organic EL element is reduced, and brightness deteriorates quickly.

SUMMARY

To solve the above-described problem, an image display device according to one aspect of the present disclosure includes an image light generating device, a first optical unit having positive power, a second optical unit including a first diffraction element and having positive power, a third optical unit having positive power, and a fourth optical unit includng a second diffraction element and having positive power, the first to fourth optical units being provided along an optical path of image light emitted from the image light generating device. On the optical path, a first intermediate image of the image light is formed between the first optical unit and the third optical unit, a pupil is formed between the second optical unit and the fourth optical unit, a second intermediate image of the image light is formed between the third optical unit and the fourth optical unit, and an exit pupil is formed at an opposite side of the fourth optical unit from the third optical unit. The image light generating device includes a first light emitting panel configured to emit first image light in a red wavelength region, a second light emitting panel configured to emit second image light in a green wavelength region, a third light emitting panel configured to emit third image light in a blue wavelength region, and a color synthesis element configured to synthesize the first image light, the second image light, and the third image light. The color synthesis element is constituted of a cross dichroic prism including a first dichroic film and a second dichroic film that intersect with each other, and each of the first dichroic film and the second dichroic film does not have a polarization separation characteristic.

In the image display device according to one aspect of the present disclosure, each of the first light emitting panel, the second light emitting panel, and the third light emitting panel may face a light incident surface of the cross dichroic prism, and may be disposed such that a longitudinal direction of an image generation region is parallel to a cross axis of the first dichroic film and the second dichroic film.

In the image display device according to one aspect of the present disclosure, each of the first light emitting panel, the second self-light-emitting panel, and the third light emitting panel may include a pixel including an organic EL element.

In the image display device according to one aspect of the present disclosure, the organic EL element may include an optical resonator.

In the image display device according to one aspect of the present disclosure, each of the first light emitting panel, the second light emitting panel, and the third light emitting panel may include a pixel including an inorganic light-emitting diode element.

In the image display device according to one aspect of the present disclosure, the first diffraction element and the second diffraction element each may be constituted of a reflection-type volume hologram.

DESCRIPTION OF EXEMPLARY EMBODIMENTS

Exemplary embodiments of the present disclosure will be described below with reference to the accompanying drawings.

In each of the figures below, to illustrate each of layers or each of members at a recognizable size, a scale of each of the layers or each of the members is different from an actual scale and an actual angle.

Figure 1:
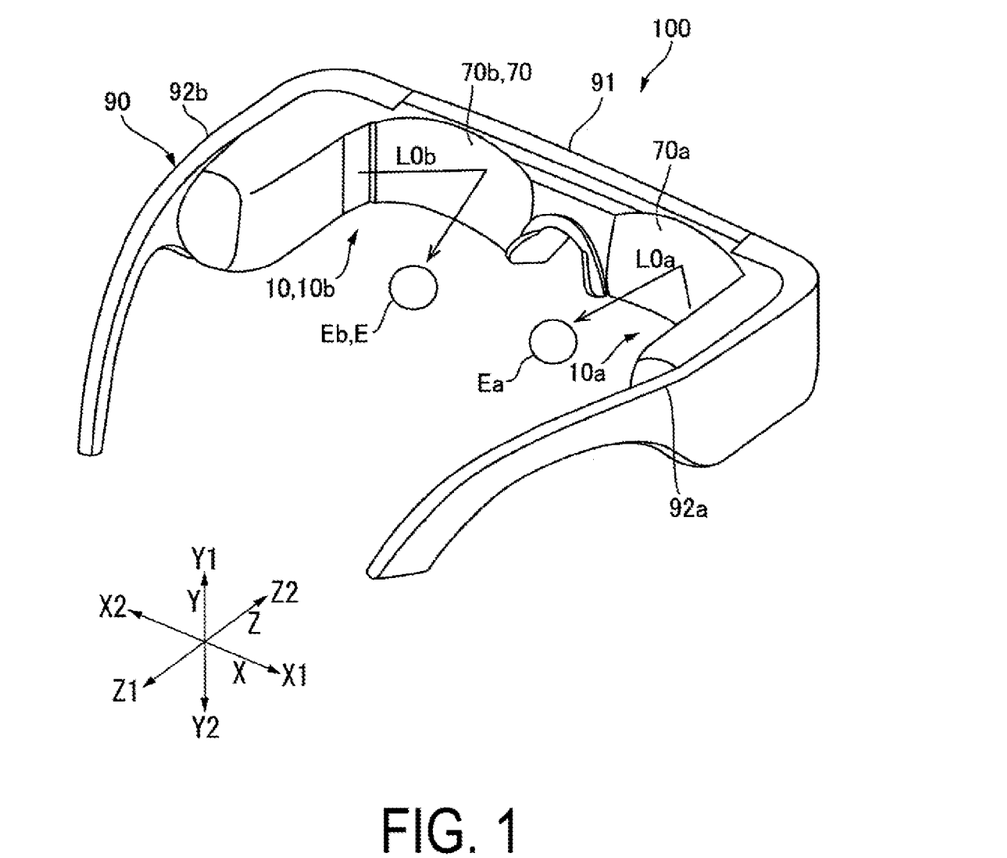
FIG. 1 is an external view illustrating one aspect of a display device according to a first exemplary embodiment.
Figure 2:
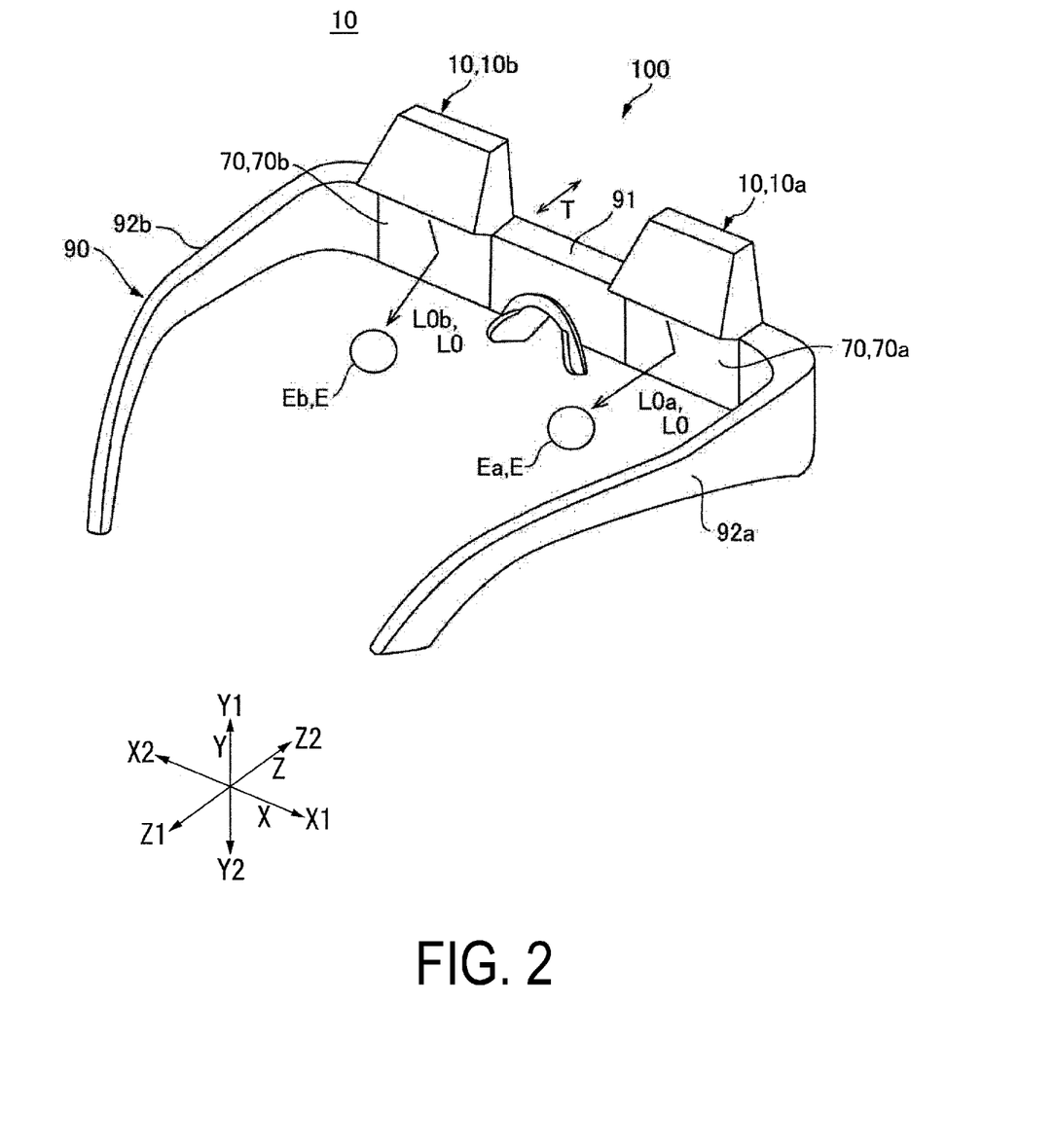
FIG. 2 is an external view illustrating another aspect of the display device.
Figure 3:
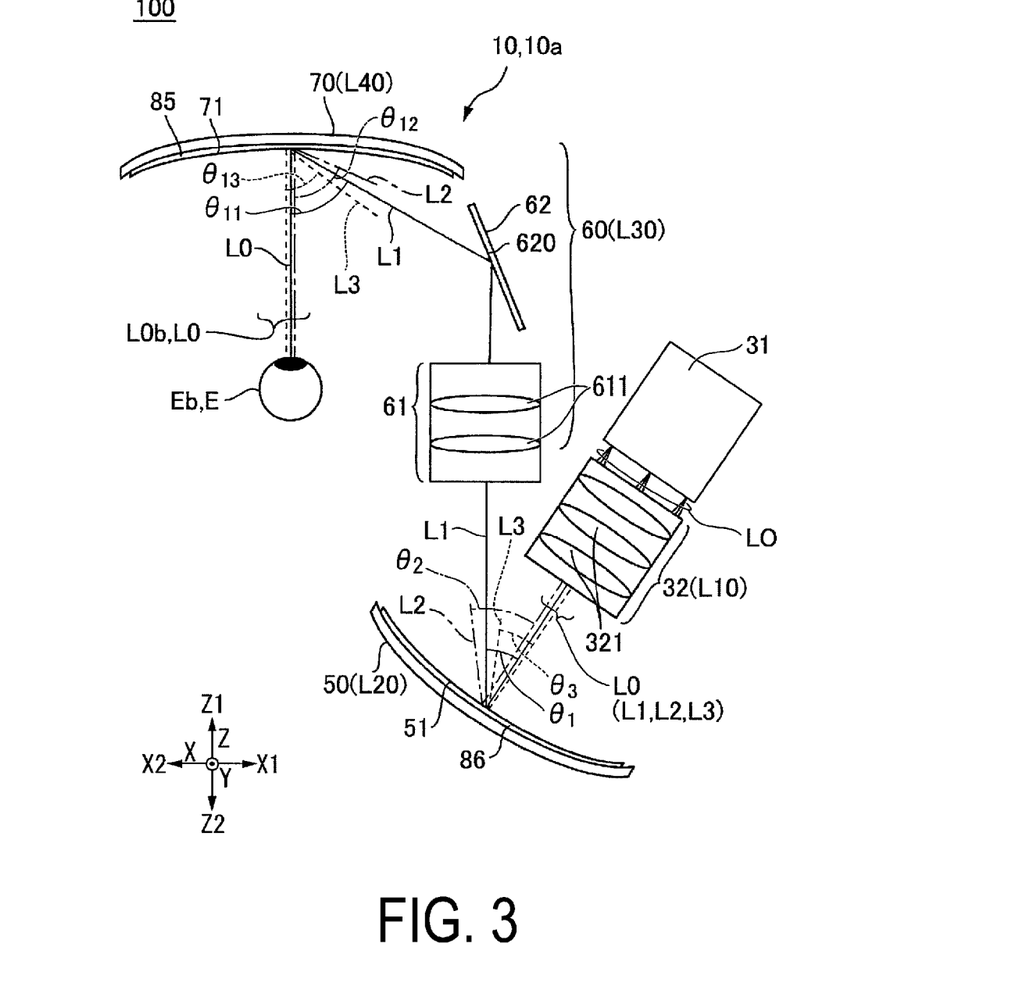
FIG. 3 is a schematic diagram illustrating one aspect of an optical system of the display device.

FIG. 1 is an external view illustrating one aspect of an image display device 100 according to the present exemplary embodiment. FIG. 2 is an external view illustrating another aspect of the image display device 100. FIG. 3 is a schematic diagram illustrating one aspect of an optical system 10 of the image display device 100 illustrated in FIG. 1.

In FIGS. 1 to 3, a front-rear direction is a direction along a Z axis, a front direction being one of the front-rear direction is a front side Z1, and a back direction being the other front-rear direction is a rear side Z2. Further, a left-and-right direction is a direction along an X axis, a right direction being one of the left-and-right direction is a right side X1, and a left direction being the other left-and-right direction is a left side X2. Further, an up-and-down direction is a direction along a Y-axis direction, an upper direction being one of the up-and-down direction is an upper side Y1, and a lower direction being the other up-and-down direction is a lower side Y2.

As illustrated in FIG. 1, the image display device 100 is a head-mounted display device, and includes a right-eye optical system 10a that causes image light L0a to be incident on a right eye Ea and a left-eye optical system 10b that causes image light L0b to be incident on a left eye Eb. For example, the image display device 100 is formed in a shape like glasses.

Specifically, the image display device 100 includes a frame 90 that holds the right-eye optical system 10a and the left-eye optical system 10b. The frame 90 is mounted on a head of an observer. The frame 90 has a front portion 91 that holds a second diffraction element 70a of the right-eye optical system 10a and a second diffraction element 70b of the left-eye optical system 10b. A temple 92a on a right side of the frame 90 and a temple 92b on a left side respectively hold an image light projecting device of the right-eye optical system 10a and an image light projecting device of the left-eye optical system 10b.

The right-eye optical system 10a and the left-eye optical system 10b have the same basic configuration. Therefore, the right-eye optical system 10a and the left-eye optical system 10b will be collectively described as the optical system 10 without distinction in the description below.

In the image display device 100 illustrated in FIG. 1, the image light L0 travels in the left-and-right direction along the X axis. However, as illustrated in FIG. 2, a configuration in which the image light L0 travels from the upper side Y1 to the lower side Y2 and is emitted to an eye E of an observer, a configuration in which the optical system 10 is disposed from a head top portion to the front of the eye E, and the like may be applied.

A basic configuration of the optical system 10 of the image display device 100 will be described with reference to FIG. 3.

FIG. 3 is a schematic diagram illustrating one aspect of the optical system 10 of the image display device 100 illustrated in FIG. 1. Note that FIG. 3 illustrates, in addition to light L1 (solid line) having a specific wavelength of the image light L0, light L2 (dot-and-dash line) on a long wavelength side with respect to the specific wavelength, and light L3 (dashed line) on a short wavelength side with respect to the specific wavelength.

As illustrated in FIG. 3, in the optical system 10, a first optical unit L10 having positive power, a second optical unit L20 having positive power, a third optical unit L30 having positive power, and a fourth optical unit L40 having positive power are disposed along a traveling direction of the image light L0 emitted from an image light generating device 31.

In the present exemplary embodiment, the first optical unit L10 having positive power is constituted of a projection optical system 32. The second optical unit L20 having positive power is constituted of a first diffraction element 50 of a reflection type. The third optical unit L30 having positive power is constituted of a light-guiding optical system 60. The fourth optical unit L40 having positive power is constituted of a second diffraction element 70 of a reflection type. In the present exemplary embodiment, the first diffraction element 50 and the second diffraction element 70 are constituted of reflection-type volume holograms 85 and 86 that are described later.

In the optical system 10, with a focus on the traveling direction of the image light L0, the image light generating device 31 emits the image light L0 toward the projection optical system 32, the projection optical system 32 emits the incident image light L0 toward the first diffraction element 50, and the first diffraction element 50 emits the incident image light L0 toward the light-guiding optical system 60. The light-guiding optical system 60 emits the incident image light L0 toward the second diffraction element 70, and the second diffraction element 70 emits the incident image light L0 toward the eye E of the observer.

The image light generating device 31 generates the image light L0. A detailed configuration of the image light generating device 31 will be described later.

The projection optical system 32 projects the image light L0 generated by the image light generating device 31. The projection optical system 32 includes a plurality of lenses 321. In FIG. 3, an example is given of a case in which the projection optical system 32 includes three lenses 321. However, the number of lenses 321 is not limited, and the projection optical system 32 may include four or more lenses 321. Further, the projection optical system 32 may be constituted in a form in which the plurality of lenses 321 are bonded together. Further, the lens 321 may be constituted of a free-form lens.

The light-guiding optical system 60 includes a lens system 61 on which the image light L0 emitted from the first diffraction element 50 is incident and a mirror 62 that emits the image light L0 emitted from the lens system 61 in a direction inclined diagonally. The lens system 61 is constituted of a plurality of lenses 611 arranged in the front-rear direction along the Z axis. The mirror 62 includes a reflective surface 620 inclined diagonally to the front-rear direction. In the present exemplary embodiment, the mirror 62 is constituted of a total reflection mirror. However, the mirror 62 may be a half mirror, and in this case, a range in which the external light is visually recognizable can be widened.

A detailed configuration of the first diffraction element 50 and the second diffraction element 70 will be described below.

In the present exemplary embodiment, the first diffraction element 50 and the second diffraction element 70 have the same basic configuration. Hereinafter, a configuration of the second diffraction element 70 will be described as an example.

Figure 4A:
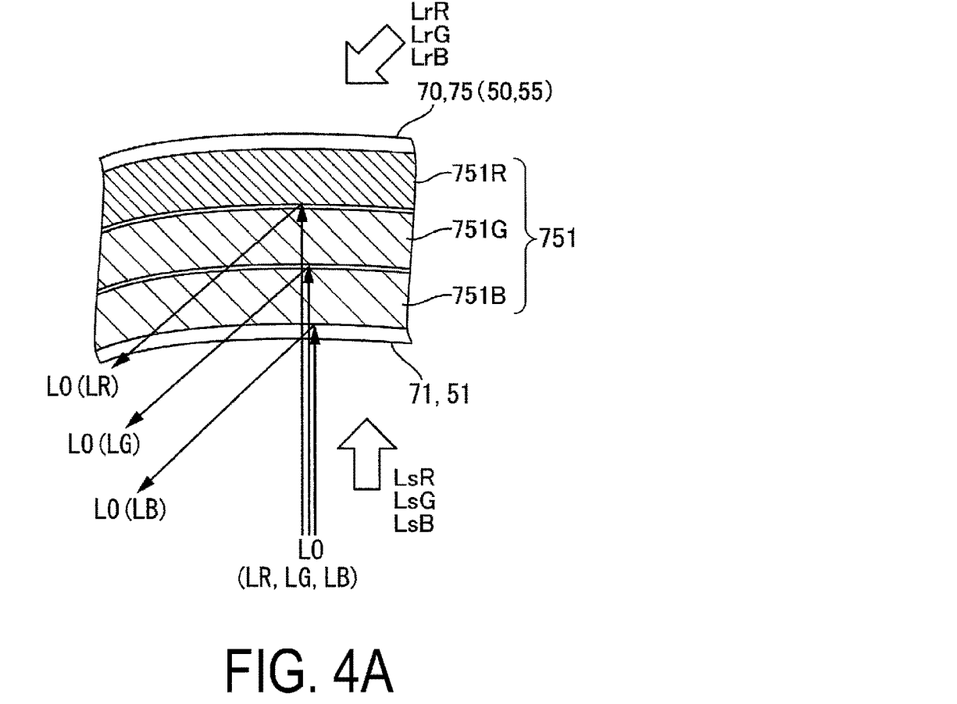
FIG. 4A is a schematic diagram of interference fringes of a diffraction element.

FIG. 4A is a schematic diagram of interference fringes 751 of the second diffraction element 70 illustrated in FIG. 3.

As illustrated in FIG. 4A, the second diffraction element 70 includes the reflection-type volume hologram 85. The reflection-type volume hologram 85 is a partially reflection diffraction optical element. Thus, the second diffraction element 70 constitutes a partial transmissive reflective combiner. Therefore, external light is also incident on the eye E via the second diffraction element 70, and thus the observer can recognize an image in which the image light L0 formed by the image light generating device 31 and the external light (background) are superimposed on each other.

The second diffraction element 70 faces the eye E of the observer. The incident surface 71 of the second diffraction element 70 on which the image light L0 is incident has a concave surface being recessed in a direction away from the eye E. In other words, the incident surface 71 has a shape having a central portion recessed and curved with respect to a peripheral portion in the incident direction of the image light L0. Thus, the image light L0 can be efficiently condensed toward the eye E of the observer.

The second diffraction element 70 includes interference fringes 751R, 751G, and 751B having a pitch corresponding to a specific wavelength. The interference fringes 751R, 751G, and 751B are recorded as a difference in refractive index and the like in a hologram photosensitive layer. The interference fringes 751R, 751G, and 751B are inclined in one direction with respect to the incident surface 71 of the second diffraction element 70 so as to correspond to a specific incident angle. Therefore, the second diffraction element 70 diffracts and then deflects the image light L0 in a predetermined direction. The specific wavelength and the specific incident angle respectively correspond to a wavelength and an incident angle of the image light L0. The interference fringes 751R, 751G, and 751B can be formed by performing interference exposure on the holographic photosensitive layer by using reference light Lr and object light Ls.

In the present exemplary embodiment, the image light L0 is image light for color display. Thus, the second diffraction element 70 includes the interference fringes 751R, 751G, and 751B having a pitch corresponding to the specific wavelength. For example, the interference fringes 751R are formed at a pitch corresponding to red light LR having a wavelength of 615 nm, for example, in a wavelength range from 580 nm to 700 nm. The interference fringes 751G are formed at a pitch corresponding to green light LG having a wavelength of 535 nm, for example, in a wavelength range from 500 nm to 580 nm. The interference fringes 751B are formed at a pitch corresponding to blue light LB having a wavelength of 460 nm, for example, in a wavelength range from 400 nm to 500 nm. The interference fringes 751R, 751G, and 751B of this kind are formed by forming a holographic photosensitive layer having sensitivity corresponding to the respective wavelengths, and performing interference exposure on the holographic photosensitive layer by using reference light LrR, LrG, and LrB and object light LsR, LsG, and LsB having the respective wavelengths.

Figure 4B:
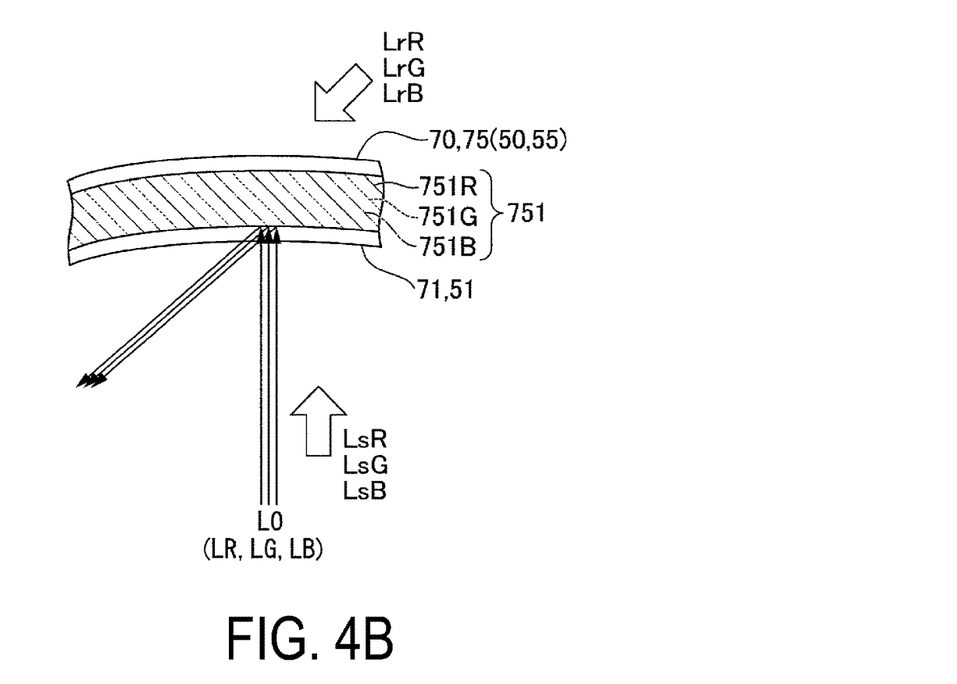
FIG. 4B is a schematic diagram illustrating another aspect of the interference fringes of the diffraction element.

Note that a photosensitive material having sensitivity corresponding to the respective wavelengths may be dispersed in the holographic photosensitive layer, and then interference exposure may be performed on the holographic photosensitive layer by using the reference light LrR, LrG, and LrB and the object light LsR, LsG, and LsB having the respective wavelengths. In this way, as illustrated in FIG. 4B, the interference fringes 751 in which the interference fringes 751R, 751G, and 751B are superimposed on one layer may be formed. Further, light having a spherical wave may be used as the reference light LrR, LrG, and LrB and the object light LsR, LsG, and LsB.

The first diffraction element 50 having the same basic configuration as the second diffraction element 70 includes the reflection-type volume hologram 86. An incident surface 51 of the first diffraction element 50 on which the image light L0 is incident has a concave surface being recessed. In other words, the incident surface 51 has a shape having a central portion recessed and curved with respect to a peripheral portion in the incident direction of the image light L0. Thus, the image light L0 can be efficiently deflected toward the light-guiding optical system 60.

Figure 5:
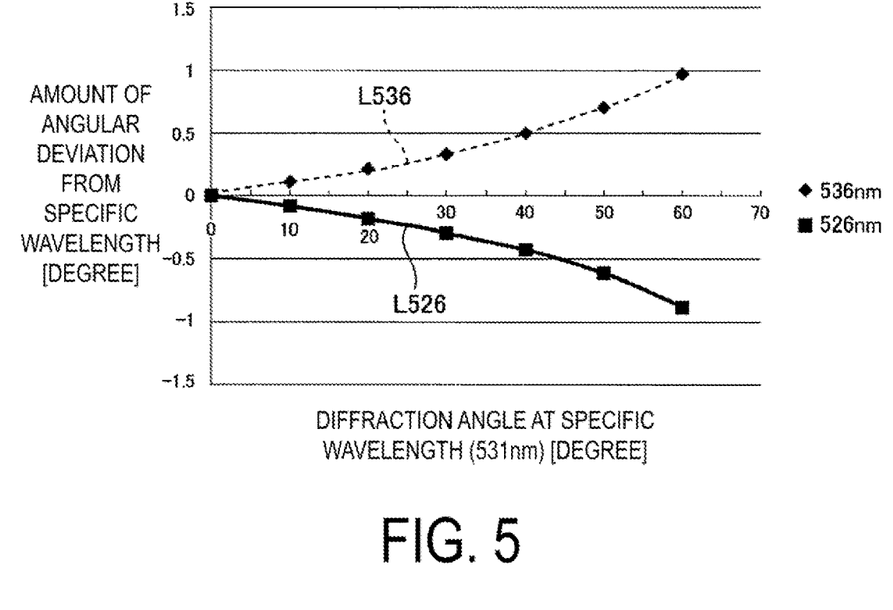
FIG. 5 is a diagram illustrating a diffraction characteristic of a first diffraction element and a second diffraction element.

FIG. 5 is a schematic diagram illustrating a diffraction characteristic of the first diffraction element 50 and the second diffraction element 70 illustrated in FIG. 3. FIG. 5 illustrates a difference in diffraction angle between a specific wavelength and a peripheral wavelength when a light beam is incident on one point on the volume hologram. In FIG. 5, when assuming that a specific wavelength is 531 nm, a deviation in diffraction angle of light having a peripheral wavelength of 526 nm is indicated by a solid line L526, and a deviation in diffraction angle of light having a peripheral wavelength of 536 nm is indicated by a dashed line L536.

As illustrated in FIG. 5, even when a light beam is incident on the same interference fringes recorded in the hologram, the light beam having a longer wavelength is more diffracted, and the light beam having a shorter wavelength is less diffracted. Thus, when two diffraction elements, namely, the first diffraction element 50 and the second diffraction element 70 are used as in the present exemplary embodiment, wavelength compensation cannot be appropriately performed unless light having a long wavelength and light having a short wavelength are each incident in consideration of light beam angles of the light having a long wavelength and the light having a short wavelength with respect to a specific wavelength. In other words, a color aberration generated by the second diffraction element 70 cannot be canceled unless the light is incident in consideration of the light beam angle for each wavelength. Further, diffraction angles vary depending on the number of interference fringes, and thus the interference fringes need to be considered.

In the optical system 10 illustrated in FIG. 3, an incident direction and the like to the second diffraction element 70 are made appropriate according to whether a sum of the number of times of formation of an intermediate image between the first diffraction element 50 and the second diffraction element 70 and the number of times of reflections by the mirror 62 is odd or even. Thus, wavelength compensation, namely, a color aberration can be canceled.

Specifically, as illustrated in FIG. 3, the image light L0 incident on the first diffraction element 50 is diffracted and deflected by the first diffraction element 50. At this time, the light L2 on the long wavelength side with respect to the specific wavelength has a diffraction angle θ2 greater than a diffraction angle θ1 of the light L1 having the specific wavelength. Further, the light L3 on the short wavelength side with respect to the specific wavelength has a diffraction angle θ3 smaller than the diffraction angle θ1 of the light L1 having the specific wavelength. Therefore, the image light L0 emitted from the first diffraction element 50 is deflected and dispersed at each wavelength.

The image light L0 emitted from the first diffraction element 50 is incident on the second diffraction element 70 via the light-guiding optical system 60 and is diffracted and then deflected by the second diffraction element 70. At this time, on the optical path from the first diffraction element 50 to the second diffraction element 70, an intermediate image is formed once, and reflection by the mirror 62 is performed once.

Therefore, when assuming that an angle between the image light L0 and a normal line of the incident surface of the second diffraction element 70 is an incident angle, the light L2 on the long wavelength side with respect to the specific wavelength has an incident angle θ12 greater than an incident angle θ11 of the light L1 having the specific wavelength while the light L3 on the short wavelength side with respect to the specific wavelength has an incident angle θ13 smaller than the incident angle θ11 of the light L1 having the specific wavelength. Further, as described above, the light L2 on the long wavelength side with respect to the specific wavelength has the diffraction angle θ2 greater than the diffraction angle θ1 of the light L1 having the specific wavelength. The light L3 on the short wavelength side with respect to the specific wavelength has the diffraction angle θ3 smaller than the diffraction angle θ1 of the light L1 having the specific wavelength.

Therefore, the light L2 on the long wavelength side with respect to the specific wavelength is incident on the first diffraction element 50 at the incident angle greater than the incident angle of the light L1 having the specific wavelength. However, the light L2 on the long wavelength side with respect to the specific wavelength has the diffraction angle greater than the diffraction angle of the light L1 having the specific wavelength, and thus, as a result, the light L2 on the long wavelength side with respect to the specific wavelength and the light L1 having the specific wavelength are substantially parallel light when being emitted from the second diffraction element 70. In contrast, the light L3 on the short wavelength side with respect to the specific wavelength is incident on the first diffraction element 50 at the incident angle smaller than the incident angle of the light L1 having the specific wavelength. However, the light L3 on the short wavelength side with respect to the specific wavelength has the diffraction angle smaller than the diffraction angle of the light L1 having the specific wavelength, and thus, as a result, the light L3 on the short wavelength side with respect to the specific wavelength and the light L1 having the specific wavelength are substantially parallel light when being emitted from the second diffraction element 70. In this way, as illustrated in FIG. 3, since the image light L0 emitted from the second diffraction element 70 is incident as the substantially parallel light on the eye E of the observer, misalignment of image formation in a retina E0 at each wavelength can be suppressed. Therefore, a color aberration generated by the second diffraction element 70 can be canceled.

A conjugated relationship between the first diffraction element 50 and the second diffraction element 70 will be described below.

Figure 6A:
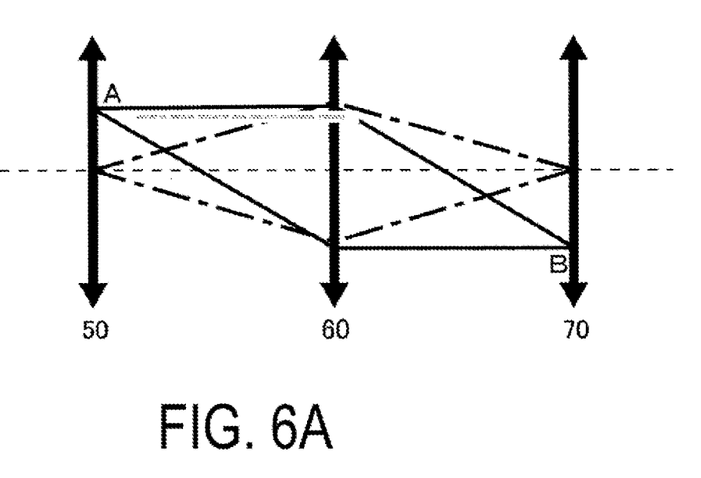
FIG. 6A is a schematic diagram of a case in which the first diffraction element and the second diffraction element are in a conjugated relationship.
Figure 6B:
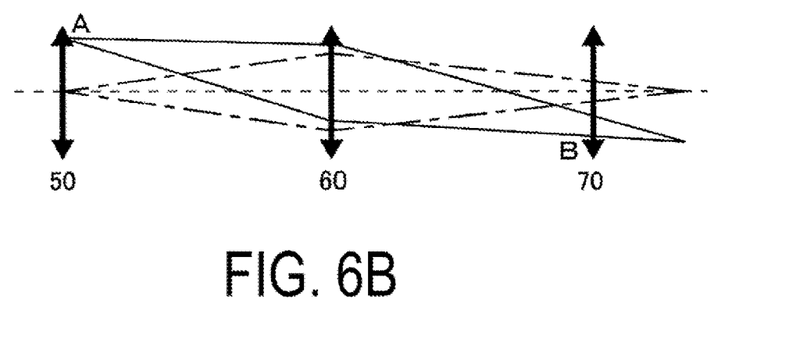
FIG. 6B is a schematic diagram of a case in which the first diffraction element and the second diffraction element are not in the conjugated relationship.
Figure 6C:
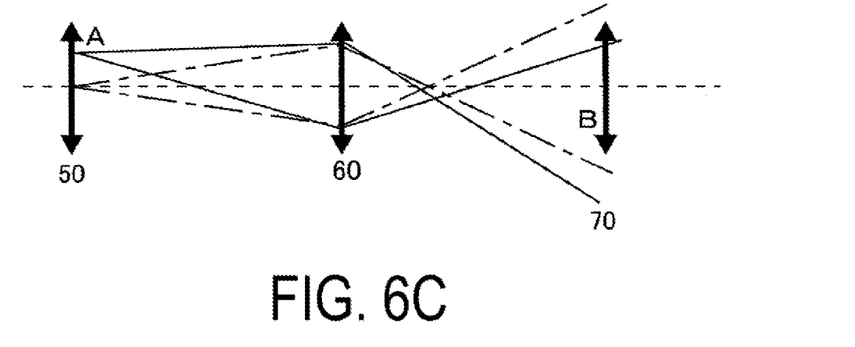
FIG. 6C is a schematic diagram of a case in which the first diffraction element and the second diffraction element are not in the conjugated relationship.
Figure 7A:
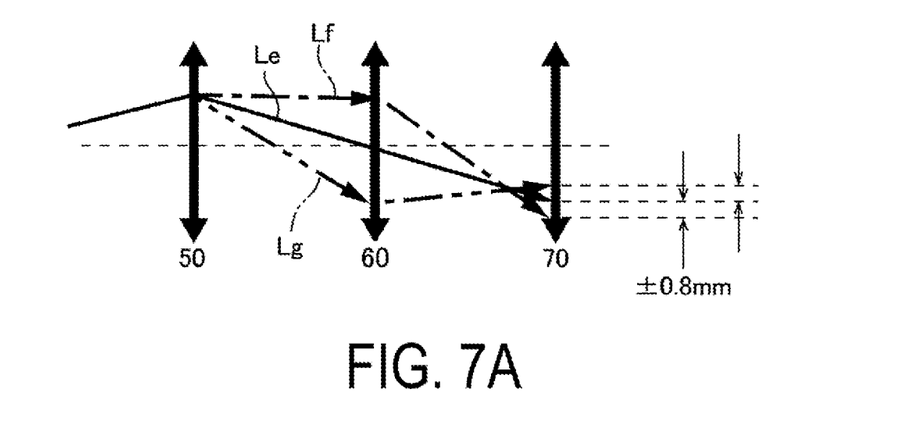
FIG. 7A is a schematic diagram illustrating a tolerance for a deviation from the conjugated relationship between the first diffraction element and the second diffraction element.
Figure 7B:
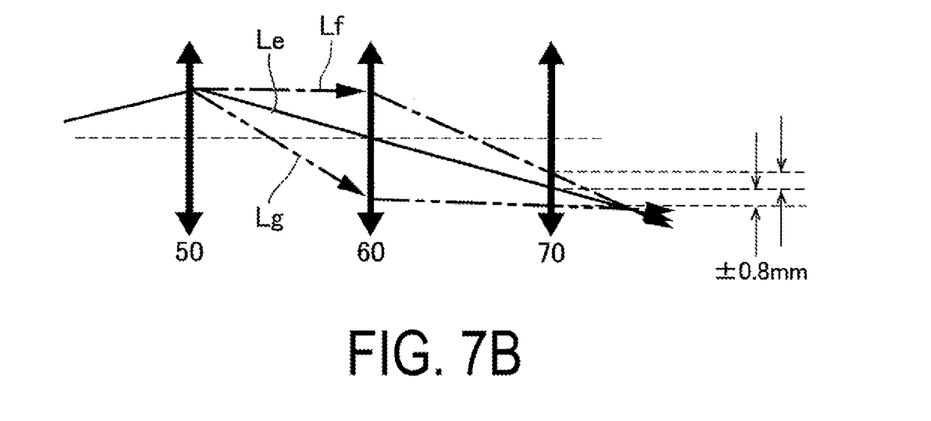
FIG. 7B is a schematic diagram illustrating another aspect of the tolerance for the deviation from the conjugated relationship between the first diffraction element and the second diffraction element.

FIG. 6A is a schematic diagram of a case in which the first diffraction element 50 and the second diffraction element 70 are in the conjugated relationship. FIGS. 6B and 6C are schematic diagrams of a case in which the first diffraction element 50 and the second diffraction element 70 are not in the conjugated relationship. FIGS. 7A and 7B are schematic diagrams illustrating a tolerances for a deviation from the conjugated relationship between the first diffraction element 50 and the second diffraction element 70 illustrated in FIGS. 6B and 6C.

In FIGS. 7A and 7B, light having a specific wavelength is indicated by a solid line Le, light having a specific wavelength of −10 nm is indicated by a dot-and-dash line Lf, and light having a specific wavelength of +10 nm is indicated by a two-dot chain line Lg. Note that, in FIGS. 6A to 6C and FIGS. 7A and 7B, the first diffraction element 50 and the second diffraction element 70 are illustrated in a perspective view, and the first diffraction element 50, the second diffraction element 70, and an optical unit L60 are indicated by arrows.

As illustrated in FIG. 6A, when the first diffraction element 50 and the second diffraction element 70 are in the conjugated relationship, divergent light emitted from a point A (a first position) of the first diffraction element 50 is converged by the optical unit L90 (lens) having positive power, and is incident on a point B (a second position corresponding to the first position) of the second diffraction element 70. Thus, a color aberration due to diffraction occurring at the point B can be compensated at the point A.

On the other hand, as illustrated in FIGS. 6B and 6C, when the first diffraction element 50 and the second diffraction element 70 are not in the conjugated relationship, divergent light beams emitted from the point A of the first diffraction element 50 are converged by the optical unit L90 (lens) having positive power at the center. However, the divergent light beams emitted from the point A cross each other in a position farther or closer with respect to the point B on the second diffraction element 70 and are incident. Thus, the point A and the point B do not have a one-to-one relationship. Here, since a compensation effect increases when interference fringes are uniform within a region, the compensation effect decreases when the first diffraction element 50 and the second diffraction element 70 are not in the conjugated relationship. On the other hand, it is difficult to compensate for the entire projection region of the second diffraction element 70 by the first diffraction element 50. Thus, in a case of the aspects illustrated in FIGS. 6B and 6C, sufficient wavelength compensation cannot be performed, and resolution degradation occurs.

Note that there is an error of about ±0.4 mm from the point B that the light having the specific wavelength reaches in the light having the wavelength of ±10 nm with respect to the specific wavelength, but a decrease in resolution is not noticeable. As a result of considering an allowable range, as illustrated in FIG. 7A, when the light beams having the specific wavelength cross each before the point B on the second diffraction element 70 where the light beams having the specific wavelength ideally reach, and are incident within a range of ±0.8 mm, a decrease in resolution is not noticeable. Further, as illustrated in FIG. 7B, when the light beams having the specific wavelength cross each other in the rear of the point B on the second diffraction element 70 where the light beams having the specific wavelength ideally reach, and are incident within a range of ±0.8 mm, a decrease in resolution is not noticeable. Therefore, even when the first diffraction element 50 and the second diffraction element 70 are not completely in the conjugated relationship, a decrease in resolution is allowable when the first diffraction element 50 and the second diffraction element 70 are substantially in the conjugated relationship, and the light reaches within the range of ±0.8 mm from the ideal point B. In other words, in the present exemplary embodiment, "the first diffraction element 50 and the second diffraction element 70 have a conjugated relationship" means that an incident position of the light having the specific wavelength falls within an error range of ±0.8 mm from an ideal incident point.

Figure 8:
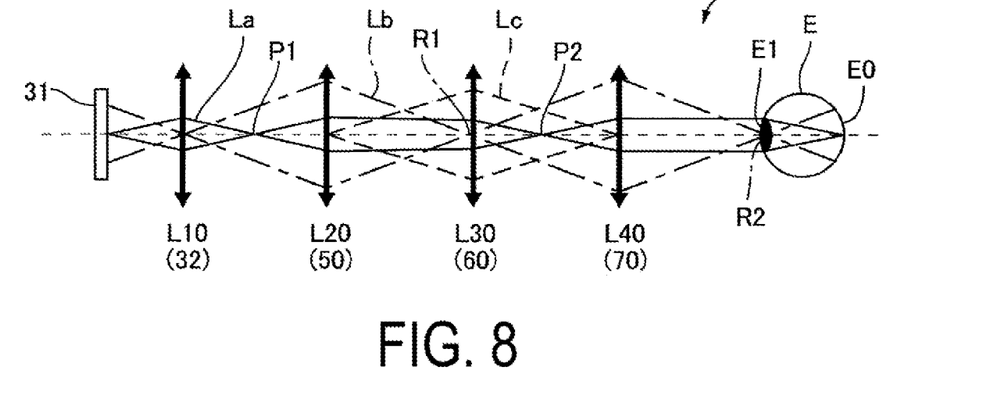
FIG. 8 is a light beam diagram of the optical system.

FIG. 8 is a light beam diagram of the optical system 10 in the present exemplary embodiment.

In FIG. 8, each optical unit disposed along an optical axis is indicated by a thick arrow. Further, a light beam emitted from one pixel of the image light generating device 31 is indicated by a solid line La, a main light beam emitted from an end portion of the image light generating device 31 is indicated by a dot-and-dash line Lb, and a position in which the light beam is in a conjugated relationship with the first diffraction element 50 is indicated by a long dashed line Lc. Here, an "intermediate image" is a place where the light beams (solid lines La) emitted from one pixel converge, and a "pupil" is a place where the main light beams (dot-and-dash line Lb) at each angle of view converge. FIG. 8 also illustrates a path of the light emitted from the image light generating device 31. Note that, in FIG. 8, all optical units are illustrated in a perspective view in order to simplify the drawing.

As illustrated in FIG. 8, in the optical system 10 in the present exemplary embodiment, the first optical unit L10 having positive power, the second optical unit L20 that includes the first diffraction element 50 and has positive power, the third optical unit L30 having positive power, and the fourth optical unit L40 that includes the second diffraction element 70 and has positive power are provided along an optical path of the image light emitted from the image light generating device 31.

A focal length of the first optical unit L10 is L/2. Focal lengths of the second optical unit L20, the third optical unit L30, and the fourth optical unit L40 are all L. Therefore, an optical distance from the second optical unit L20 to the third optical unit L30 and an optical distance from the third optical unit L30 to the fourth optical unit L40 are equal.

In the optical system 10, a first intermediate image P1 of the image light is formed between the first optical unit L10 and the third optical unit L30. A pupil R1 is formed between the second optical unit L20 and the fourth optical unit L40. A second intermediate image P2 of the image light is formed between the third optical unit L30 and the fourth optical unit L40. The fourth optical unit L40 collimates the image light and forms an exit pupil R2. At this time, the third optical unit L30 causes the image light emitted from the second optical unit L20 to be incident as divergent light on the fourth optical unit L40. The second optical unit L20 causes the image light emitted from the first optical unit L10 to be incident as convergent light on the third optical unit L30. In the optical system 10 in the present exemplary embodiment, the pupil R1 is formed in the vicinity of the third optical unit L30 between the second optical unit L20 and the fourth optical unit L40. The vicinity of the third optical unit L30 refers to a position, between the second optical unit L20 and the third optical unit L30, closer to the third optical unit L30 than the second optical unit L20, or a position, between the third optical unit L30 and the fourth optical unit L40, closer to the third optical unit L30 than the fourth optical unit L40.

The third optical unit L30 causes, of the image light from one point of the image light generating device 31, light having a peripheral wavelength deviated from the specific wavelength deflected by the first diffraction element 50 to be incident on a predetermined range of the second diffraction element 70. In other words, the first diffraction element 50 and the second diffraction element 70 are in a conjugated relationship or a substantially conjugated relationship. Here, an absolute value of magnification of the projection on the second diffraction element 70 by the third optical unit L30 of the first diffraction element 50 ranges from 0.5 times to 10 times. The absolute value of the magnification may range from 1 time to 5 times.

Therefore, according to the optical system 10 in the present exemplary embodiment, the first intermediate image P1 of the image light is formed between the projection optical system 32 and the light-guiding optical system 60, the pupil R1 is formed in the vicinity of the light-guiding optical system 60, the second intermediate image P2 of the image light is formed between the light-guiding optical system 60 and the second diffraction element 70, and the second diffraction element 70 collimates the image light and forms the exit pupil R2.

In the optical system 10 in the present exemplary embodiment, the first intermediate image P1 is formed between the first optical unit L10 (projection optical system 32) and the second optical unit L20 (first diffraction element 50).

The optical system 10 in the present exemplary embodiment satisfies four conditions (Condition 1, Condition 2, Condition 3, and Condition 4) described below.

Condition 1: A light beam emitted from one point of the image light generating device 31 forms an image as one point in the retina E0.

Condition 2: An incident pupil of the optical system and a pupil of an eye are conjugated.

Condition 3: The first diffraction element 50 and the second diffraction element 70 are appropriately disposed so as to compensate for a peripheral wavelength.

Condition 4: The first diffraction element 50 and the second diffraction element 70 are in a conjugated relationship or a substantially conjugated relationship.

More specifically, as clearly seen from the dot-and-dash line Lb illustrated in FIG. 8, a light beam emitted from one point of the image light generating device 31 satisfies [Condition 1] that an image is formed as one point in the retina E0. Thus, an observer can visually recognize one pixel. Further, as clearly seen from the solid line La illustrated in FIG. 8, [Condition 2] that the relationship between the incident pupil of the optical system 10 and the pupil E1 of the eye E is conjugated (conjugation of the pupil) is satisfied. Thus, the entire image generated by the image light generating device 31 can be visually recognized. Further, [Condition 3] that the first diffraction element 50 and the second diffraction element 70 are appropriately disposed so as to compensate for a peripheral wavelength is satisfied. Thus, a color aberration generated by the second diffraction element 70 can be canceled by performing wavelength compensation. Further, as clearly seen from the long dashed line Lc illustrated in FIG. 8, [Condition 4] that the first diffraction element 50 and the second diffraction element 70 are in a conjugated relationship or a substantially conjugated relationship is satisfied. Thus, a light beam can be incident on a place having the same interference fringes in the first diffraction element 50 and the second diffraction element 70, and wavelength compensation can be appropriately performed. As described above, degradation of resolution of an image can be suppressed.

Hereinafter, the image light generating device 31 will be described.

The image light generating device 31 in the present exemplary embodiment emits image light acquired by synthesizing a plurality of color light beams from a plurality of image display panels configured to emit image light that does not have a polarization characteristic.

Figure 9:
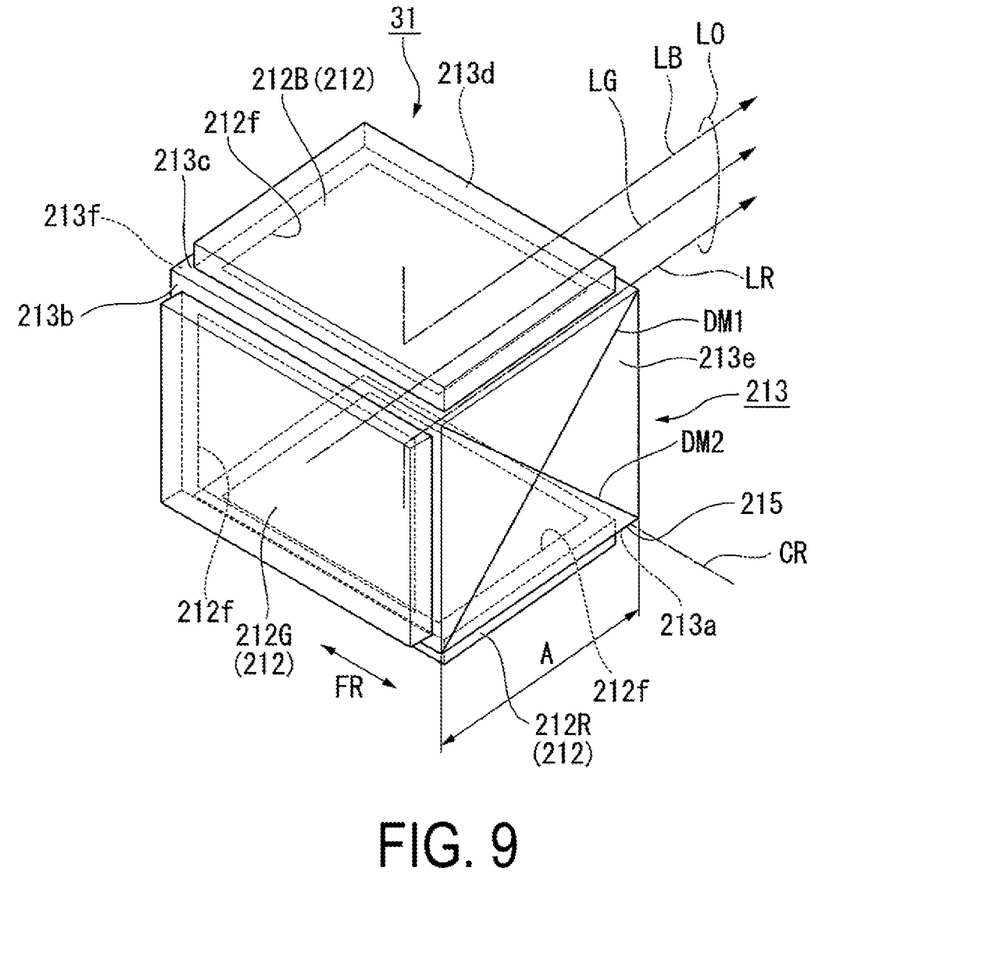
FIG. 9 is a perspective view of an image light generating device.

FIG. 9 is a perspective view of the image light generating device 31.

As illustrated in FIG. 9, the image light generating device 31 includes a first panel 212R (first light emitting panel), a second panel 212G (second light emitting panel), a third panel 212B (third light emitting panel), and a cross dichroic prism 213 (color synthesis element). Each of the first panel, the second panel, and the third panel is a light emitting panel that does not include a lighting device such as a backlight. Therefore, light that does not have a polarization characteristic is emitted from each of the first panel, the second panel, and the third panel.

The first panel 212R includes an image generation region 212f in which a plurality of pixels are provided in a matrix, and a non-image generation region. An organic EL element is provided in each of the plurality of pixels. The second panel 212G includes an image generation region 212f in which a plurality of pixels are provided in a matrix, and a non-image generation region. An organic EL element is provided in each of the plurality of pixels. The third panel 212B includes an image generation region 212f in which a plurality of pixels are provided in a matrix, and a non-image generation region. A top-emitting organic EL element is provided in each of the plurality of pixels.

In the present exemplary embodiment, the plurality of organic EL elements provided in the image generation region 212f of the first panel 212R emit first image light in a red wavelength region. Further, the plurality of organic EL elements provided in the image generation region 212f of the second panel 212G emit second image light in a green wavelength region. Further, the plurality of organic EL elements provided in the image generation region 212f of the third panel 212B emit third image light in a blue wavelength region.

Hereinafter, a configuration of the first panel 212R, the second panel 212G, and the third panel 212B will be described. The first panel 212R, the second panel 212G, and the third panel 212B differ from each other in material of a light emitting layer and a transport layer formed of an organic EL material, but have the same basic configuration of the panel. Therefore, a configuration of the panel will be described below with reference to the first panel 212R.

Figure 10:
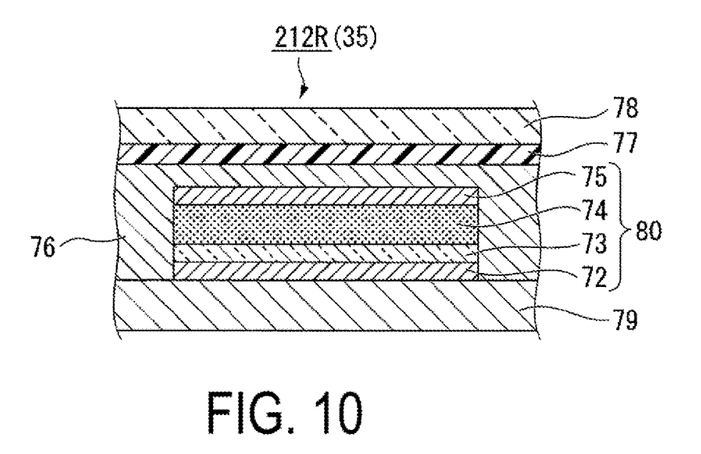
FIG. 10 is a schematic cross-sectional view illustrating a configuration of one pixel included in a light emitting panel.

FIG. 10 is a cross-sectional view illustrating a configuration of one organic EL element 35 of the first panel 212R. As illustrated in FIG. 10, in the organic EL element 35, a reflective electrode 72, an anode 73, a light-emitting functional layer 74, and a cathode 75 are provided on one surface of a substrate 79 in order from the substrate 79 side. The substrate 79 is formed of a semiconductor material such as silicon, for example. The reflective electrode 72 is formed of a light-reflective conductive material containing, for example, aluminum, silver, or the like. More specifically, the reflective electrode 72 may be formed of a single material such as aluminum, silver, or the like, or may be formed of a layered film of titanium (Ti)/AlCu (aluminum copper alloy), or the like.

The anode 73 is formed of a conductive material having optical transparency, such as indium tin oxide (ITO), for example. Although not illustrated, the light-emitting functional layer 74 is formed of a plurality of layers including a light-emitting layer including an organic EL material, a hole injecting layer, an electron injecting layer, and the like. The light-emitting layer is formed of a known organic EL material corresponding to each light emission color of red, green, and blue.

The cathode 75 functions as a semi-transmissive reflective layer having properties (semi-transmissive reflective properties) that transmit some light and reflect the remaining light. For example, by forming a photoreflective conductive material, such as an alloy containing silver or magnesium, into a sufficiently thin film, the cathode 75 having the semi-transmissive reflective properties can be achieved. The emitted light from the light-emitting functional layer 74 has a component of a specific resonance wavelength being selectively amplified during reciprocation between the reflective electrode 72 and the cathode 75, is transmitted through the cathode 75, and is emitted to an observation side (opposite to the substrate 79). In other words, a plurality of layers from the reflective electrode 72 to the cathode 75 constitute an optical resonator 80.

The plurality of layers from the reflective electrode 72 to the cathode 75 are covered by a sealing film 76. The sealing film 76 is a film for preventing entry of air and moisture, and is constituted of a single layer or a plurality of layers of an inorganic material or an organic material having optical transparency. A color filter 77 is provided on one surface of the sealing film 76. In the third panel 212B, the color filter 77 is constituted of a light-absorbing filter layer that absorbs light in a wavelength range other than the blue wavelength range and transmits light in the blue wavelength range. Similarly, in the first panel 212R, a color filter is constituted of a light-absorbing filter layer that absorbs light in a wavelength range other than the red wavelength range and transmits light in the red wavelength range. In the second panel 212G, a color filter is constituted of a light-absorbing filter layer that absorbs light in a wavelength range other than the green wavelength range and transmits light in the green wavelength range.

In the present exemplary embodiment, each of the first panel 212R, the second panel 212G, and the third panel 212B includes the optical resonator 80, and thus light corresponding to each color is emitted by resonance of light at a resonance wavelength. Furthermore, the color filter 77 is provided on a light emission side of the optical resonator 80, and thus color purity of the light emitted from each of the panels 212R, 212G, and 212B is further enhanced.

A cover glass 78 for protecting each of the panels 212R, 212G, and 212B is provided on one surface of the color filter 77.

As illustrated in FIG. 9, the first panel 212R emits the first image light LR in the red wavelength region. Therefore, the image light emitted from the first panel 212R is incident on the cross dichroic prism 213 as the first image light LR in red. The second panel 212G emits the second image light LG in the green wavelength region. Therefore, the image light emitted from the second panel 212G is incident on the cross dichroic prism 213 as the second image light LG in green. The third panel 212B emits the third image light LB in the blue wavelength region. Therefore, the image light emitted from the third panel 212B is incident on the cross dichroic prism 213 as the third image light LB in blue.

A peak wavelength in the red wavelength region is, for example, greater than or equal to 630 nm and less than or equal to 680 nm. A peak wavelength in the green wavelength region is, for example, greater than equal to 495 nm and less than or equal to 570 nm. A peak wavelength in the blue wavelength region is, for example, greater than or equal to 450 nm and less than or equal to 490 nm. Each of the first image light LR, the second image light LG, and the third image light LB is light that does not have a polarization characteristic. In other words, each of the first image light LR, the second image light LG, and the third image light LB is unpolarized light that does not have a specific vibration direction. Note that unpolarized light, namely, light that does not have a polarization characteristic is light that is not in a completely unpolarized state and includes a polarization component to some extent. For example, the light has a degree of polarization to the extent that does not actively affect an optical member such as a dichroic film, for example, in terms of optical performance, for example, a degree of polarization of less than or equal to 20%.

The cross dichroic prism 213 is constituted of a transparent member having a quadrangular columnar shape. The cross dichroic prism 213 includes a first incident surface 213a, a third incident surface 213c facing the first incident surface 213a, a second incident surface 213b contacting perpendicularly to the first incident surface 213a and the third incident surface 213c, an emission surface 213d facing the second incident surface 213b, a fifth surface 213e contacting perpendicularly to the first incident surface 213a, the second incident surface 213b, the third incident surface 213c, and the emission surface 213d, and a sixth surface 213f facing the fifth surface 213e.

The cross dichroic prism 213 includes a first dichroic film DM1 that does not have a polarization separation characteristic, and a second dichroic film DM2 that does not have a polarization separation characteristic. The first dichroic film DM1 and the second dichroic film DM2 cross each other at an angle of 90°. Hereinafter, an axis in which the first dichroic film DM1 and the second dichroic film DM2 cross each other is referred to as a cross axis CR.

The "dichroic film that does not have a polarization separation characteristic" in the specification is a film having a substantially similar wavelength separation characteristic regardless of a polarization direction (S-polarized light, P-polarized light) of light incident on the dichroic film. A specific example is indicated below to define the "dichroic film that does not have a polarization separation characteristic".

Figure 11:
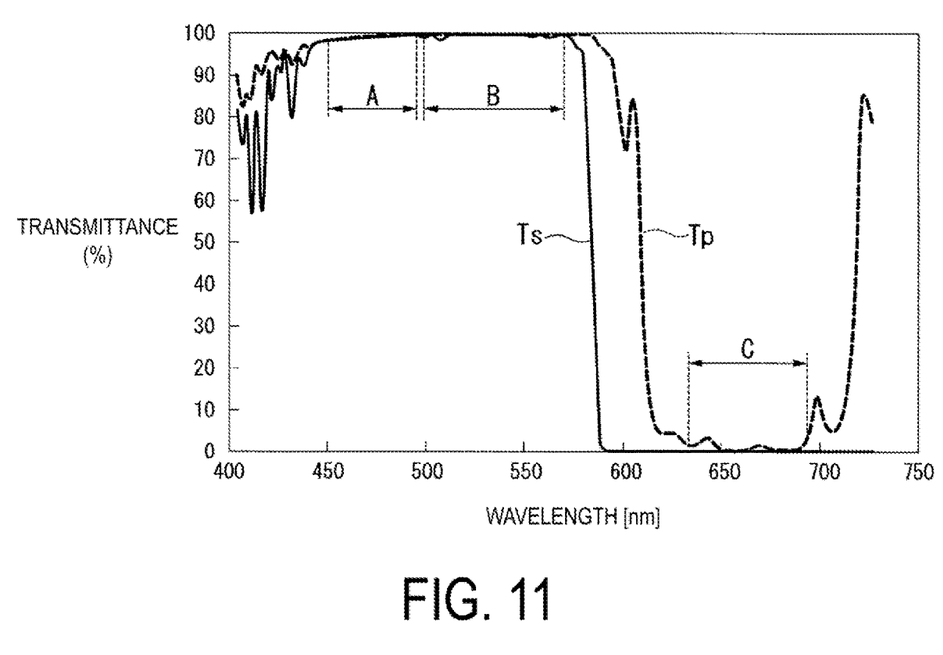
FIG. 11 is a diagram illustrating one example of a transmittance-wavelength characteristic of a dichroic film that does not have a polarization separation characteristic.

FIG. 11 is a diagram illustrating one example of a transmittance-wavelength characteristic of a dichroic film that does not have a polarization separation characteristic.

In FIG. 11, the horizontal axis is a wavelength [nm], and the vertical axis is a transmittance [%]. A solid line graph indicated by a reference numeral Ts indicates a transmittance-wavelength characteristic of S-polarized light, and a dashed line graph indicated by a reference numeral Tp indicates a transmittance-wavelength characteristic of P-polarized light.

The "dichroic film that does not have a polarization separation characteristic" refers to a film having, when unpolarized light is incident on the dichroic film, a similar trend in the transmittance Ts of the S-polarized light and the transmittance Tp of the P-polarized light in a wavelength region to be controlled, such as a wavelength region A in FIG. 11: for example, a blue wavelength region of greater than or equal to 450 nm and less than or equal to 490 nm, a wavelength region B: for example, a green wavelength region of greater than or equal to 495 nm and less than or equal to 570 nm, and a wavelength region C: for example, a red wavelength region of greater than or equal to 630 nm and less than or equal to 680 nm. It also refers to the film having a characteristic such that an average difference between the transmittance Ts and the transmittance Tp in each of the wavelength regions is less than or equal to 30% and may be less than or equal to 10%.

Note that a transmittance is used for expression in FIG. 11, but the same is true when a reflectance is used for expression. The "dichroic film that does not have a polarization separation characteristic" refers to a film having, when unpolarized light is incident on the dichroic film, a similar trend in a reflectance of S-polarized light and a reflectance of P-polarized light in a wavelength region to be controlled, and having a characteristic such that an average difference in reflectance in each wavelength region is less than or equal to 30% and may be less than or equal to 10%.

The first dichroic film DM1 has a characteristic so as to reflect the first image light LR and transmit the second image light LG and the third image light LB. The second dichroic film DM2 has a characteristic so as to reflect the second image light LG and transmit the first image light LR and the third image light LB. In this way, the first image light LR, the second image light LG, and the third image light LB are synthesized, and the image light L0 in full color is emitted from the emission surface 213d.

The first panel 212R is disposed so as to face the first incident surface 213a. The second panel 212G is disposed so as to face the second incident surface 213b. The third panel 212B is disposed so as to face the third incident surface 213c.

Each of the first panel 212R, the second panel 212G, and the third panel 212B includes the rectangular image generation region 212f having long sides and short sides. The image generation region 212f is a region of the surface facing the cross dichroic prism 213 of each panel except for a non-image generation region of a peripheral portion and that substantially generates an image. Each of the first panel 212R, the second panel 212G, and the third panel 212B faces the cross dichroic prism 213, and is disposed such that a longitudinal direction FR of the image generation region 212f is parallel to the cross axis CR of the cross dichroic prism 213.

Each of the first panel 212R, the second panel 212G, and the third panel 212B may include an external terminal regions for electrically coupling a drive circuit board (not illustrated) and a panel outside the long sides of the image generation region. In this case, the external terminal region does not contribute to generation of an image, and thus may not need to be disposed so as to face the cross dichroic prism 213. Therefore, each of the first panel 212R, the second panel 212G, and the third panel 212B may be bonded together such that the image generation region faces the cross dichroic prism 213 and the external terminal region protrudes to the outside of the cross dichroic prism 213.

A direction in which the external terminal region of each panel protrudes to the outside of the cross dichroic prism 213 is not particularly limited as long as the direction is not a direction in which adjacent panels do not interfere with each other. For example, the first panel 212R may protrude to the left side of the cross dichroic prism 213 in FIG. 9, the second panel 212G may protrude to the upper side of the cross dichroic prism 213 in FIG. 9, and the third panel 212B may protrude to the right side of the cross dichroic prism 213 in FIG. 9. Alternatively, the first panel 212R and the third panel 212B may both protrude to the right side of the cross dichroic prism 213 in FIG. 9, and the second panel 212G may protrude to the lower side of the cross dichroic prism 213 in FIG. 9.

In the present exemplary embodiment, as described above, each of the first panel 212R, the second panel 212G, and the third panel 212B is disposed such that the longitudinal direction FR of the image generation region is parallel to the cross axis CR of the cross dichroic prism 213. Thus, a dimension A of one side of the cross dichroic prism 213 can be made smaller than that when the longitudinal direction FR of the image generation region 212f is disposed perpendicular to the cross axis CR of the cross dichroic prism 213.

According to the image display device 100 in the present exemplary embodiment, the first diffraction element 50 and the second diffraction element 70 formed of the reflection-type volume holograms 85 and 86 are used, and the first diffraction element 50 and the second diffraction element 70 are appropriately disposed. Thus, a color aberration can be corrected, and degradation of resolution of an image due to the color aberration can be suppressed.

However, according to consideration of the inventors, a wavelength width of a reflection wavelength region in a reflection-type hologram is extremely narrow, for example, 20 nm. Thus, in a known display device using two reflection-type holograms, a lot of image light emitted from the display is not reflected by the holograms and is transmitted through the holograms. As a result, it was found that there is a problem in that light-guiding efficiency from the display to an eye of an observer decreases to, for example, less than or equal to 10%.

For this problem, in the image display device 100 in the present exemplary embodiment, the above-described problem is solved by a combination of the following configurations.

In a case of the image display device 100 according to the present embodiment, the first panel 212R, the second panel 212G, and the third panel 212B are constituted of a light emitting panel in which each pixel includes the organic EL element 35. Therefore, light that does not have a polarization characteristic is emitted from each of the first panel 212R, the second panel 212G, and the third panel 212B. Further, the image light emitted from the first panel 212R, the second panel 212G, and the third panel 212B including the organic EL elements has high contrast and is bright.

A general cross dichroic prism has two dichroic films having a polarization characteristic. It is assumed that a display device including this cross dichroic prism is a display device in a comparative example. In the display device in the comparative example, in a case in which image light is unpolarized light, that is, light that does not have a polarization characteristic, only one linear polarized light beam among two linear polarized light beams that are included in the image light and are orthogonal to each other contributes to formation of an image, and the other linear polarized light beam does not contribute to the formation of the image. Thus, in the display device in the comparative example, the light utilization efficiency is low and a bright image is not acquired.

In contrast, in the image display device 100 in the present exemplary embodiment, the cross dichroic prism 213 includes the first dichroic film DM1 and the second dichroic film DM2 that do not have a polarization separation characteristic. In this way, even though the image light L0 is light that does not have a polarization characteristic, both linear polarized light beams can contribute to formation of an image. Thus, according to the image display device 100 in the present exemplary embodiment, the light utilization efficiency is higher and a brighter image is acquired as compared to the display device in the comparative example.

Further, in the image display device 100 in the present exemplary embodiment, a bright image is acquired, and thus there is no need to unnecessarily increase a current supplied to the first panel 212R, the second panel 212G, and the third panel 212B. Thus, a life of the organic EL element can be maintained, and rapid degradation of the brightness can be suppressed.

Further, in the image display device 100 in the present exemplary embodiment, the image light L0 is guided in air between the first diffraction element 50 and the second diffraction element 70, and a member such as a light-guiding plate is not used. Thus, the weight of a front portion of the image display device 100 can be reduced, and a load applied to a nose can be reduced. In this way, the image display device 100 is less likely to slip off, and the comfort of the image display device 100 can be improved.

Further, in the image light generating device 31, as described above, each of the first panel 212R, the second panel 212G, and the third panel 212B is disposed such that the longitudinal direction FR of the image generation region is parallel to the cross axis CR of the cross dichroic prism 213. Thus, a dimension A of one side of a surface of the cross dichroic prism 213 perpendicular to the cross axis CR can be reduced. As a result, size reduction of the image display device 100 can be achieved.

Note that the technical scope of the present disclosure is not limited to the above-described exemplary embodiment, and various modifications can be made to the above-described exemplary embodiment without departing from the spirit and gist of the present disclosure.

For example, in the exemplary embodiments described above, each of the first panel 212R, the second panel 212G, and the third panel 212B is constituted of an organic EL panel including a pixel having an organic EL element, but may also be constituted of an inorganic light-emitting diode (LED) panel including a pixel having an inorganic LED element.

Further, in the exemplary embodiment described above, an example has been illustrated in which the first diffraction element and the second diffraction element are constituted of a reflection-type volume hologram, but the first diffraction element and the second diffraction element may be constituted of another hologram element, for example, a surface relief hologram, a blazed hologram, and the like. Even when these hologram elements are used, a thin diffraction element having high diffraction efficiency is acquired.

Further, the specific configuration of the image display device exemplified in the exemplary embodiment described above such as the number, arrangement, shape, and the like of each component may be appropriately changed.

What is claimed is:
1. An image display device, comprising:
an image light generating device;
a projection optical system;
a first diffraction element;
a mirror; and
a second diffraction element, wherein:
the projection optical system, the first diffraction element, the mirror, and the second diffraction element are provided along an optical path of image light emitted from the image light generating device such that on the optical path:
- a first intermediate image of the image light is formed between the projection optical system and the mirror,
- a pupil is formed between the first diffraction element unit and the second diffraction element,
- a second intermediate image of the image light is formed between the mirror and the second diffraction element, and
- an exit pupil is formed at an opposite side of the second diffraction element from the mirror, and the image light generating device includes:
- a first light emitting panel configured to emit a first image light,
- a second light emitting panel configured to emit a second image light, and
- a dichroic prism configured to synthesize the first image light, and the second image light, the dichroic prism includes a dichroic film having a characteristic such that an average difference in: (a) a reflectance of first polarized light, and (b) a reflectance of second polarized light, in a wavelength region of the first image light and in a wavelength region of the second image light, is less than or equal to 30%.

2. The image display device according to claim 1, wherein the projection optical system includes a lens, and the projection optical system has positive power.

3. The image display device according to claim 1, wherein the first diffraction element includes a first reflection-type volume hologram,
a shape of the first diffraction element has a central portion of the first diffraction element recessed and curved with respect to a peripheral portion of the first diffraction element in the incident direction of the image light,
the second diffraction element includes a second reflection-type volume hologram, and
a shape of the second diffraction element has a central portion of the second diffraction element recessed and curved with respect to a peripheral portion of the second diffraction element in the incident direction of the image light.

4. The image display device according to claim 1, wherein the dichroic film has a characteristic such that an average difference in: (a) a reflectance of first polarized light, and (b) a reflectance of second polarized light, in a wavelength region of the first image light and in a wavelength region of the second image light, is less than or equal to 10%.

5. The image display device according to claim 1, wherein the image light generating device includes a third light emitting panel configured to emit third image light,
the dichroic film includes a first dichroic film and a second dichroic film that intersect with each other, and
the first dichroic film and the second dichroic film has a characteristic such that an average difference in: (a) a reflectance of the first polarized light, and (b) a reflectance of the second polarized light, in a wavelength region of the first image light, a wavelength region of the second image light, and a wavelength region of the third image light, is less than or equal to 30%.

6. The image display device according to claim 1, wherein each of the first light emitting panel and the second light emitting panel faces a light incident surface of the dichroic prism, and are disposed such that a longitudinal direction of an image generation region is parallel to a longitudinal direction of the dichroic prism.

7. The image display device according to claim 1, wherein each of the first light emitting panel and the second light emitting panel includes a pixel having an organic electroluminescence element.

8. The image display device according to claim 7, wherein the organic electroluminescence element includes an optical resonator.

9. The image display device according to claim 1, wherein each of the first light emitting panel and the second light emitting panel includes a pixel having an inorganic light-emitting diode element.

* * * * *